(12) United States Patent
Kasinger et al.

(10) Patent No.: US 6,499,260 B2
(45) Date of Patent: *Dec. 31, 2002

(54) PORTABLE GREENHOUSE STRUCTURE AND METHOD AND APPARATUS FOR ASSEMBLING SAME

(75) Inventors: Jerry J. Kasinger, Vancouver, WA (US); Thomas S. Ohnstad, Salem, OR (US)

(73) Assignee: Amtech Corporation, Yelm, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/512,137

(22) Filed: Feb. 23, 2000

(65) Prior Publication Data

US 2001/0042347 A1 Nov. 22, 2001

(51) Int. Cl.$^7$ .................................................. E04H 1/00
(52) U.S. Cl. .............................. 52/79.4; 52/81; 52/100; 52/82; 52/395; 52/90; 220/7; 20/56
(58) Field of Search .................. 52/81.4, 81.5, 52/463, 469, 470, 582.1, 584.1, 235, 134, 136, 137, 509, 81.3, 772, 780, DIG. 10, 17, 284, 800.12; 47/17; 403/174, 217

(56) References Cited

U.S. PATENT DOCUMENTS

| 1,991,359 A | * | 2/1935 | Blake ............................ 20/56 |
| 3,841,045 A | * | 10/1974 | Criswell ...................... 52/395 |
| 3,999,336 A | | 12/1976 | Bance |
| 4,009,543 A | * | 3/1977 | Smrt ............................. 52/81 |
| 4,068,421 A | | 1/1978 | Marovich |
| 4,075,811 A | * | 2/1978 | Keith ........................... 52/395 |
| 4,092,809 A | | 6/1978 | Bellas et al. |
| 4,092,810 A | | 6/1978 | Sumner |
| 4,154,253 A | | 5/1979 | McCullough |
| 4,154,547 A | | 5/1979 | Mez |
| 4,167,838 A | | 9/1979 | Metheny |
| 4,188,764 A | | 2/1980 | Gode |
| 4,263,758 A | * | 4/1981 | Seaich ........................... 52/81 |

(List continued on next page.)

OTHER PUBLICATIONS

Hawley's Condensed Chemical Dictionary, Lewis, Sr., Richard J., 1997, John Wiley & Sons, Inc., 896.*

Primary Examiner—Carl D. Friedman
Assistant Examiner—Steve Varner
(74) Attorney, Agent, or Firm—Susan D. Betcher; Seed IP Law Group PLLC

(57) ABSTRACT

The present invention provides a portable greenhouse structure comprising a base in the shape of a right-polygonal cylinder having a top and a bottom, wherein the base comprises a plurality of wall panels connected along abutting edges; a hemispherical roof attached to the top of the base, wherein the hemispherical roof has a polygonal hole in the apex thereof; and a polygonal panel having the same shape as the polygonal hole, wherein the polygonal panel is moveable between an open position and a closed position, and wherein the polygonal panel sealably covers the polygonal hole when in the closed position. The present invention also provides an apparatus for joining a first panel to a second panel along abutting edges thereof, the apparatus comprising a first extrusion attached to the abutting edge of the first panel, wherein the first extrusion comprises a stem which projects away from a plane of the panel and has a panel side and a mating side; a second extrusion attached to the abutting edge of the second panel, wherein the second extrusion comprises a stem which projects away from a plane of the panel and has a panel side and a mating side; and a clamp which holds the stem of the first extrusion and the stem of the second extrusion together such that the mating side of the first extrusion is in contact with the mating side of the second extrusion.

19 Claims, 15 Drawing Sheets

U.S. PATENT DOCUMENTS

| | | |
|---|---|---|
| 4,295,303 A | 10/1981 | Klebe |
| 4,385,850 A | 5/1983 | Bobath |
| 4,402,168 A | 9/1983 | Maier, Jr. |
| 4,412,405 A | 11/1983 | Tucker |
| 4,422,267 A | 12/1983 | Whitehouse |
| 4,501,099 A | 2/1985 | Boaz |
| 4,601,139 A * | 7/1986 | Esposito .................. 52/90 |
| 4,741,123 A | 5/1988 | Gauthier |
| 4,757,909 A * | 7/1988 | Matsuura .................. 220/7 |
| 5,088,245 A * | 2/1992 | Anderson .................. 52/82 |
| 5,155,952 A * | 10/1992 | Herwegh et al. ............. 52/100 |
| 5,165,207 A | 11/1992 | Oehlke |
| 5,570,500 A | 11/1996 | Merkel |
| 5,722,551 A | 3/1998 | Cocciemiglio, Jr. |
| 5,904,006 A | 5/1999 | Evans |

* cited by examiner

Fig. 9a
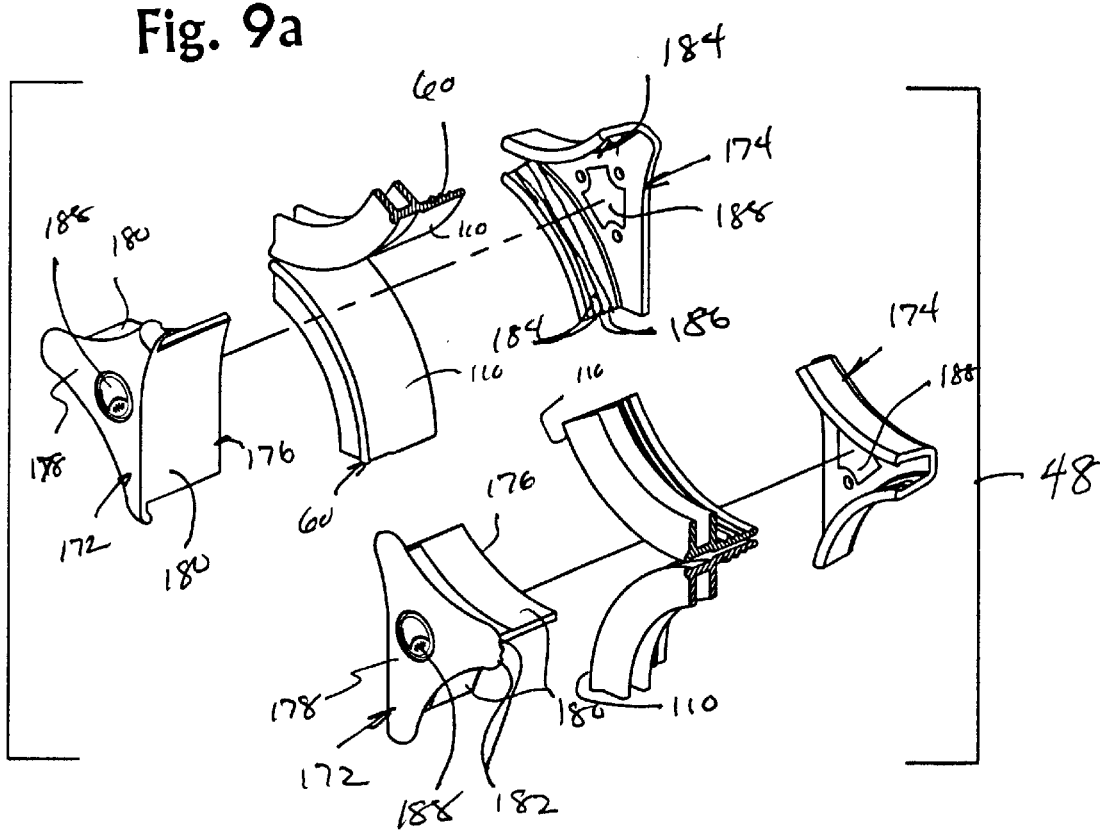
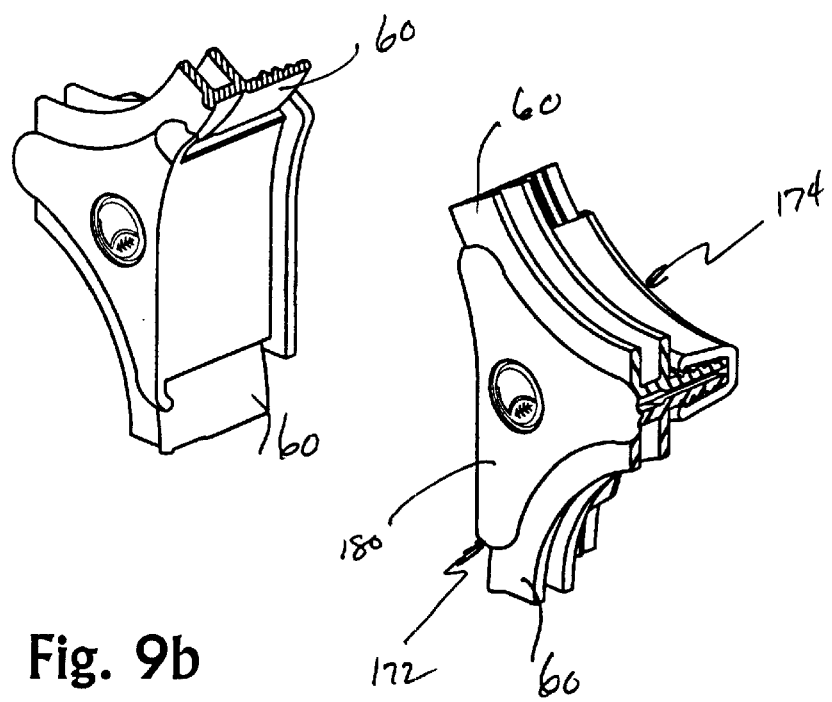
Fig. 9b

PORTABLE GREENHOUSE STRUCTURE AND METHOD AND APPARATUS FOR ASSEMBLING SAME

FIELD OF THE INVENTION

The present invention relates to greenhouses, and in particular to greenhouses that are portable, structurally efficient, and easy to assemble and disassemble.

BACKGROUND

Greenhouses enable both commercial growers and serious hobbyists to produce an artificial environment in which plants can grow all year long. Commercial growers and hobbyists alike can use their greenhouses for a variety of purposes, including growing decorative plants such as flowers and shrubs, or growing vegetables for consumption. Most existing greenhouses are permanent structures which vary in size according to their application—commercial growers use enormous greenhouses with elaborate heating and humidifying systems, while hobbyists have smaller ones without the elaborate systems, usually in the back yard of their house.

The permanent nature of most greenhouses means that a substantial investment is required to install and operate one. Before installing a greenhouse, an architect and engineer must be hired to design and properly situate the greenhouse to obtain the proper amount of light, the land for the greenhouse must be allocated and prepared, and a contractor must be hired to build the structure. Once built, the costs of operating a traditional greenhouse are high as well. Depending on the climate, substantial heating may be necessary to maintain the proper temperature in the greenhouse. Special and expensive equipment may be necessary to ensure the right humidity inside.

For commercial growers, who derive revenue from the use of their greenhouses, a large investment in a greenhouse is less problematic. But for hobbyists the high investment involved in building a permanent greenhouse can deter all but the most serious and dedicated. Most hobbyists don't have room in their yards for such a structure, much less the money to pay for the construction and operation of one. Moreover, even if they have the room for a greenhouse, most hobbyists are constrained in the amount of freedom they have to place the greenhouse in its optimal geographic orientation for growing plants. There is therefore a need in the art for an inexpensive, small-scale greenhouse structure that can easily be set up by a hobbyist or other non-professional user.

SUMMARY OF THE INVENTION

The present invention provides a portable greenhouse structure comprising a base in the shape of a right-polygonal cylinder having a top and a bottom, wherein the base comprises a plurality of wall panels connected along abutting edges; a hemispherical roof attached to the top of the base, wherein the hemispherical roof has a polygonal hole in the apex thereof; and a polygonal panel having the same shape as the polygonal hole, wherein the polygonal panel is moveable between an open position and a closed position, and wherein the polygonal panel sealably covers the polygonal hole when in the closed position.

The present invention also provides an apparatus for joining a first panel to a second panel along abutting edges thereof, the apparatus comprising a first extrusion attached to the abutting edge of the first panel, wherein the first extrusion comprises a stem which projects away from a plane of the panel and has a panel side and a mating side; a second extrusion attached to the abutting edge of the second panel, wherein the second extrusion comprises a stem which projects away from a plane of the panel and has a panel side and a mating side; and a clamp which holds the stem of the first extrusion and the stem of the second extrusion together such that the mating side of the first extrusion is in contact with the mating side of the second extrusion.

BRIEF DESCRIPTION OF THE DRAWINGS

FIG. 9A is an exploded isometric view of an embodiment of a fixture used to join the corners of a pair of roof panels and provide a support for a moveable panel connected thereto.

FIG. 9B is an isometric view of the fixture of FIG. 9A, shown in its assembled state.

DETAILED DESCRIPTION OF THE INVENTION

Described below is an embodiment of the present invention, which illustrates a way in which the invention can be implemented. Although the embodiment shown is described in the context of greenhouse, the structure can also be used for other purposes. In the descriptions that follow, like numerals represent like elements in all figures. For example, where the numeral 20 is used to refer to a particular element in one figure, the numeral 20 appearing in any other figure refers to the same element.

Figure 1A:
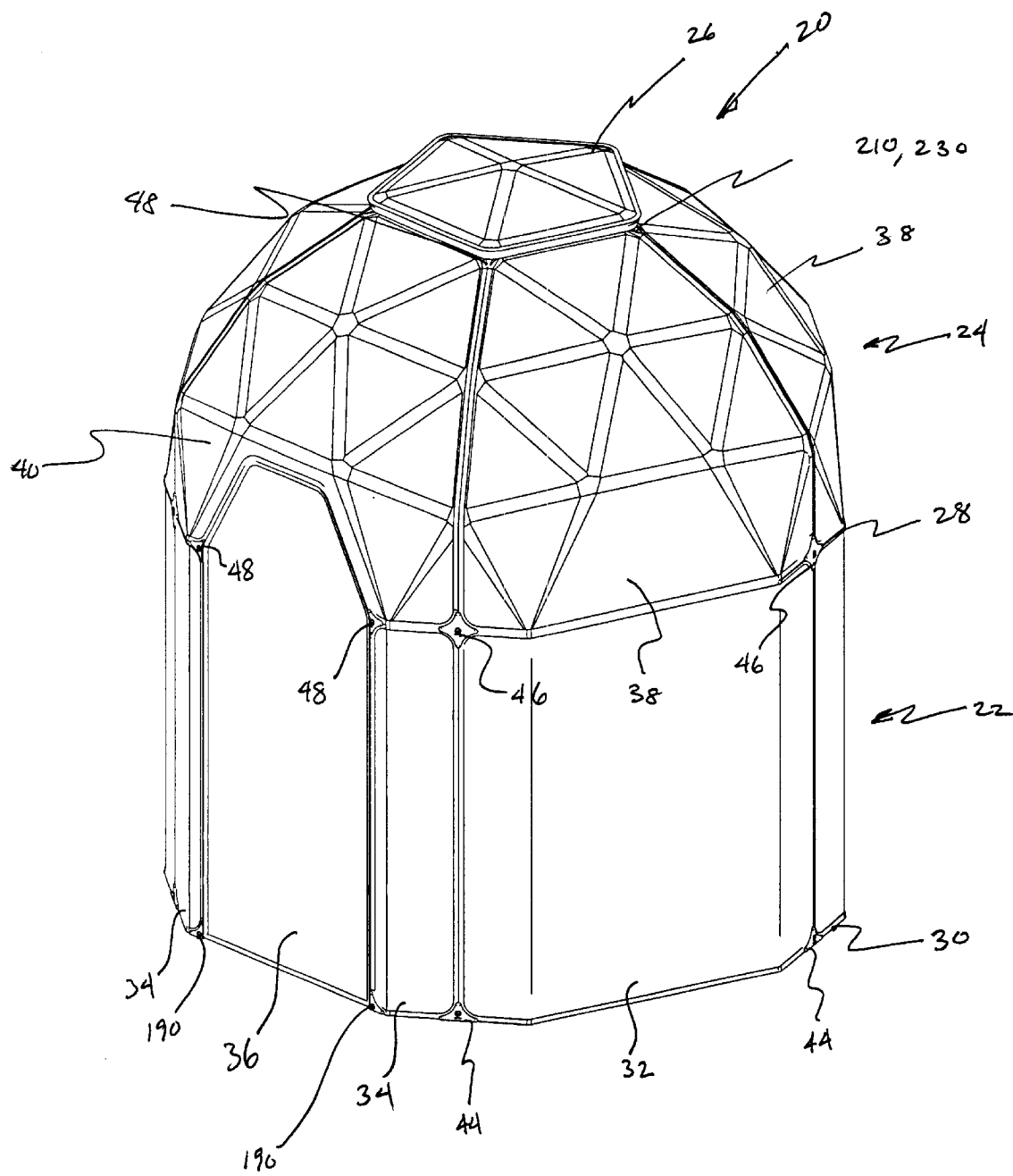
FIG. 1A is an isometric drawing of an embodiment of the present inventive greenhouse.
Figure 1B:
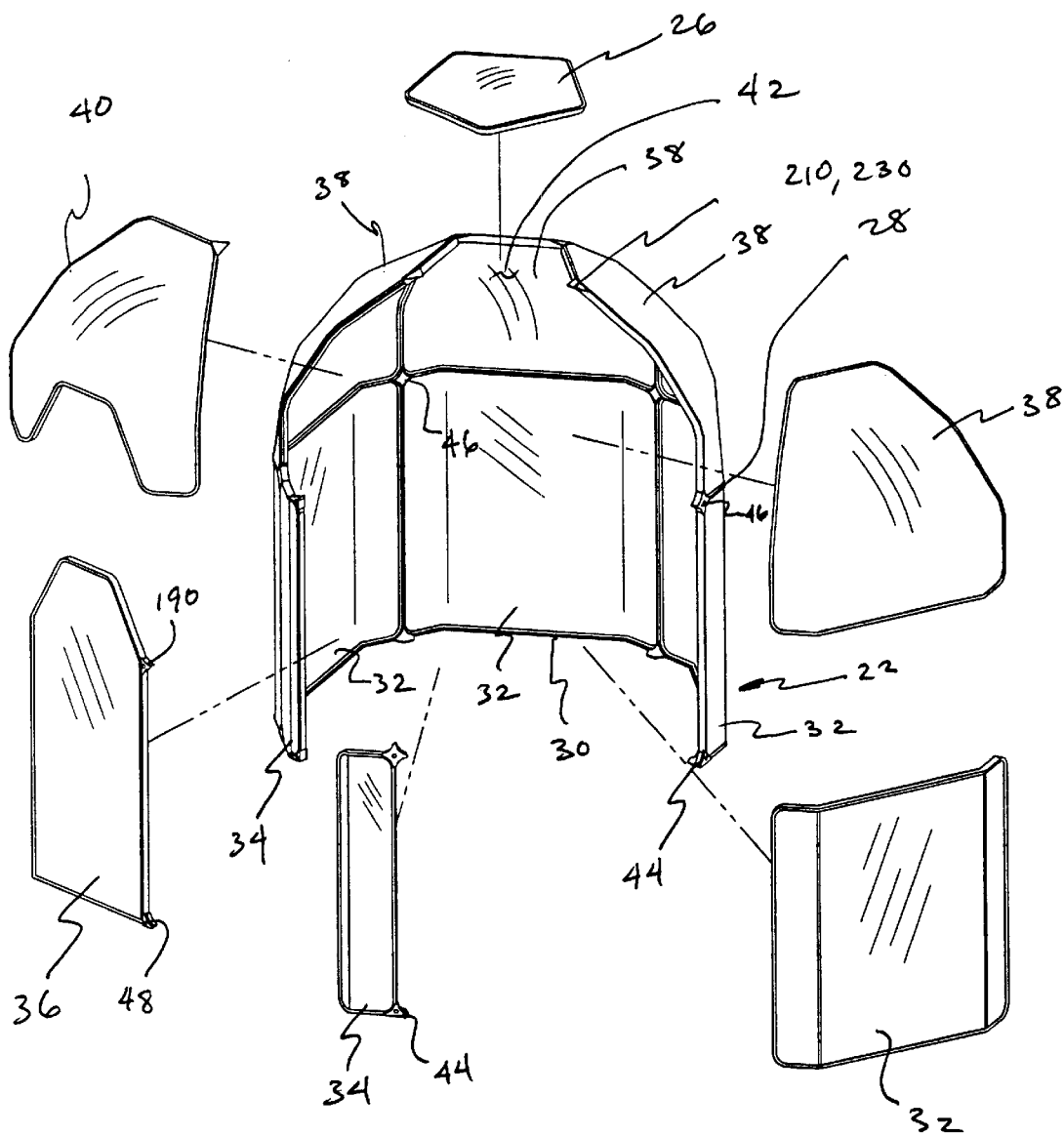
FIG. 1B is an exploded isometric drawing of an embodiment of the present inventive greenhouse.

FIGS. 1A and 1B show a first embodiment of the inventive greenhouse 20. FIG. 1A shows the greenhouse in its assembled state. The greenhouse 20 comprises a right-polygonal cylindrical base 22, a hemispherical roof 24 attached to the base, and a polygonal vent 26 at the apex of the hemispherical roof. In the embodiment shown, the greenhouse has an overall diameter of 8 feet and an overall height of 9 feet, although the greenhouse 20 can be built to any size desired.

FIG. 1B illustrates the components of the greenhouse 20 and how they are put together. The base 22 is a right-polygonal cylinder (i.e., a cylinder whose cross-section is a polygon), and has a top 28 to which the roof 24 is joined and a bottom 30 which can be, but need not be, secured to some sort of permanent foundation, such as a concrete pad or wooden deck. The base comprises a plurality of wall panels 32, a pair of door wall panels 34, and a door 36. The lateral edges 50 of the wall panels 32 and the lateral edges 68 of the door wall panels 34 are joined together along their lateral edges to form the cylindrical shape of the base; details of how the panels are joined are further explained below in connection with FIG. 6. The wall panels 32 are all identical in shape and size, while the door wall panels 34 positioned on either side of the door 36 are smaller so that the door 36 can be accommodated. The door 36 allows access to the interior of the greenhouse and, although only one door is shown, there may be more than one door per greenhouse. In a preferred embodiment, the base (and thus the wall panels and door wall panels) has a height of 5 feet and the cross-section of the base is a regular ten-sided polygon, although a greater or lesser number of sides is possible.

Figure 3A:
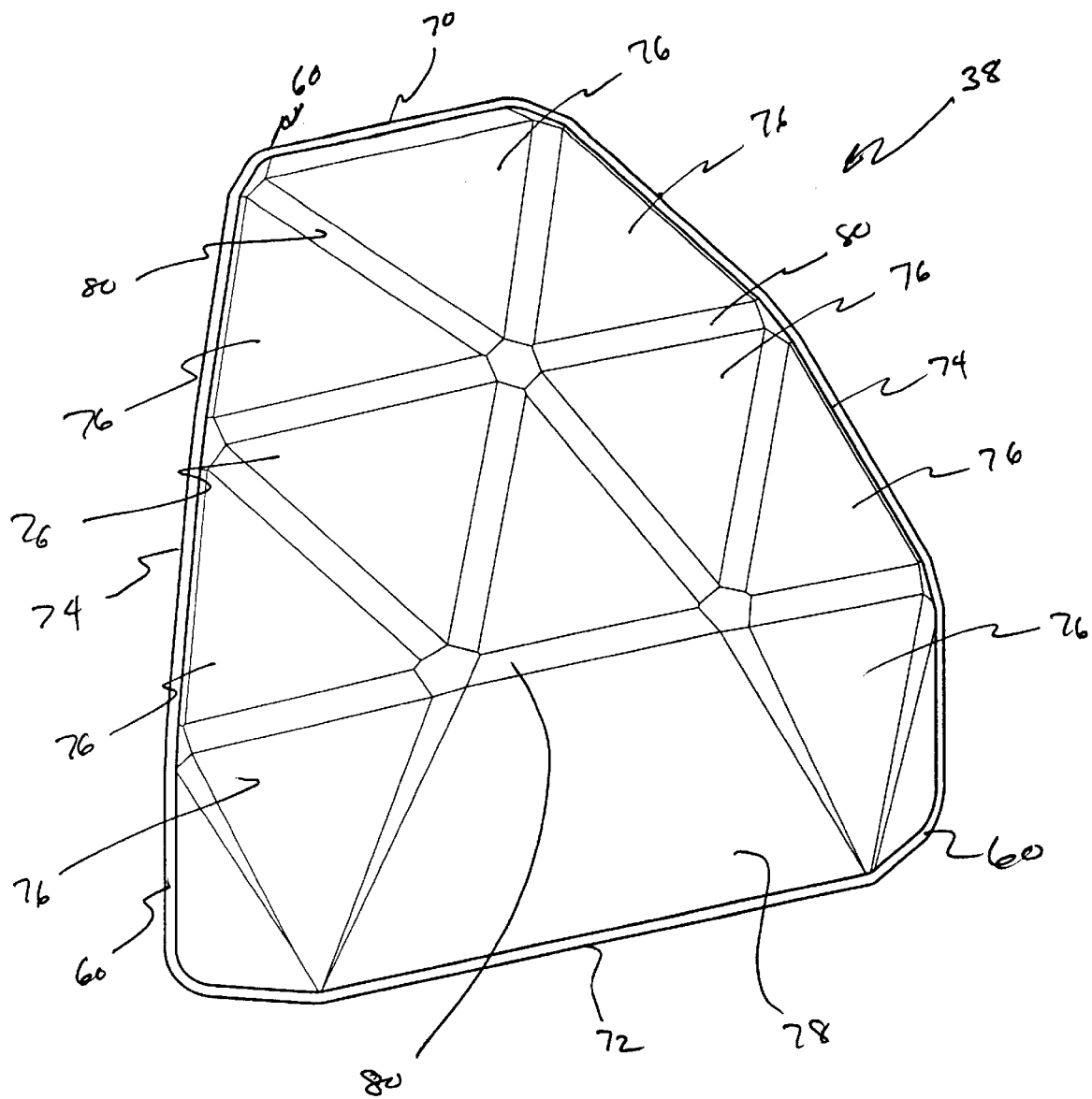
FIG. 3A is an isometric drawing of one of the plurality of panels that make up the roof shown in FIGS. 1A and 1B.
Figure 3B:
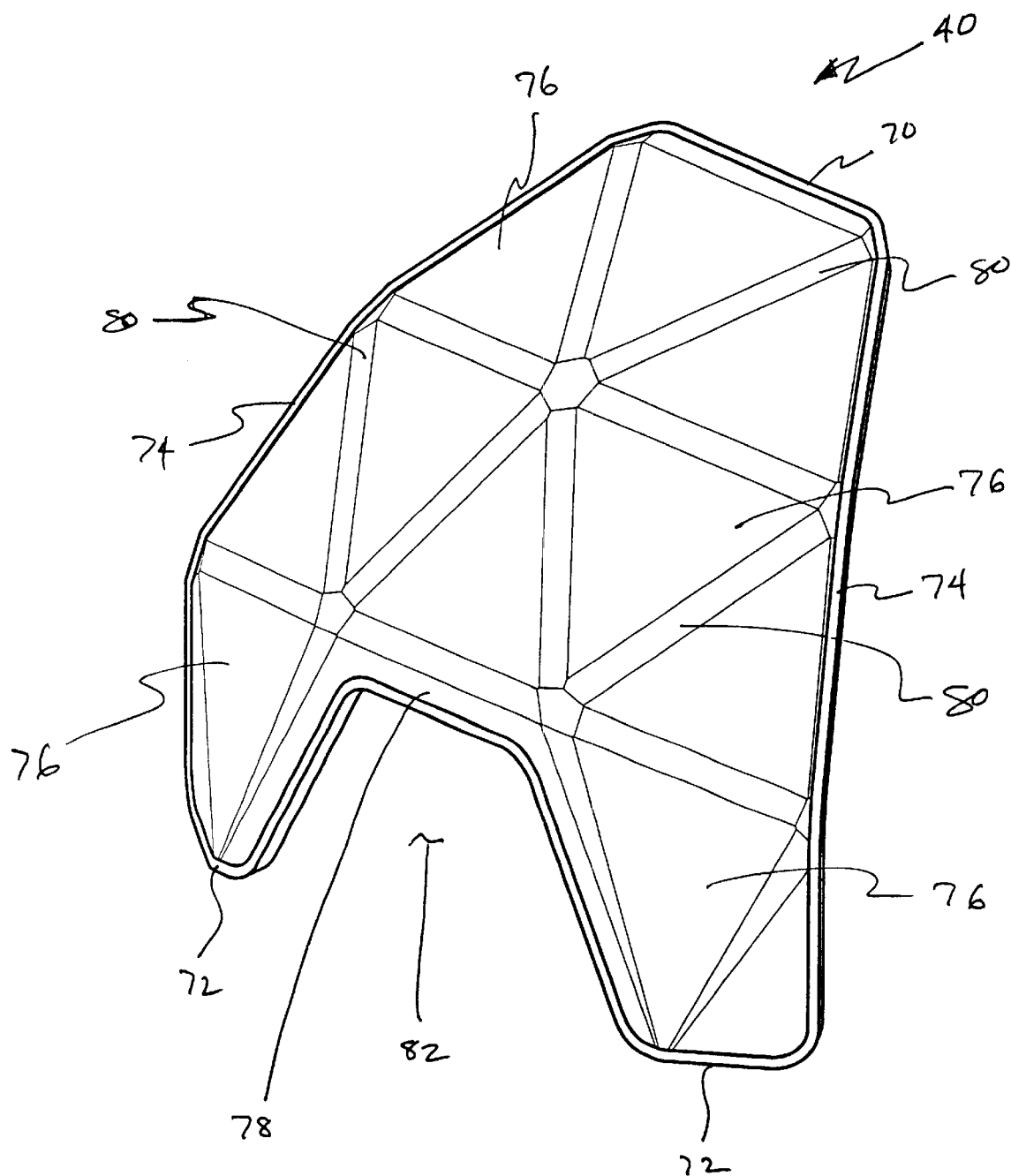
FIG. 3B is an isometric drawing of the roof door panel which is attached at the part of the base where a door is attached.

The hemispherical roof 24 is attached to the top 28 of the base and comprises a plurality of substantially wedge-shaped panels joined along their lateral edges 74 (see FIGS. 3A and 3B). The plurality of panels comprises a plurality of identical roof panels 38 (see FIG. 3A) and one or more roof door panels 40 (see FIG. 3B). The roof door panel 40, whose position coincides with the position of the door 36, is identical to the roof panels 38 except for a cutout in the lower portion of the panel to accommodate the upper part of the door 36. When the roof is attached to the base 22, the roof is positioned such that the joints along the lateral edges of the roof panels 38 and roof door panel 40 align with the joints of abutting wall panels. In a preferred embodiment of the greenhouse, there are four roof panels 38 and one roof door panel 40, although any number between 2 and 20 may be used depending on the size of the greenhouse being produced and the number of doors in the greenhouse. In addition, the preferred embodiment has a hemispherical roof with a height of 4 feet that is geodesic; this is shown in FIG. 1A. The roof 24 need not, however, be geodesic, as illustrated in FIG. 1B.

At the apex of the roof 24 is a polygonal vent 26, which corresponds in size and shape to the polygonal hole 42 left at the apex of the roof when the roof panels are assembled. As further described below, the polygonal vent 26 covers and seals the polygonal hole 42 and allows the automatic release of hot air trapped near the apex of the roof. For the preferred embodiment of the greenhouse 20 having a roof 24 made up of five panels, the polygonal hole 42 is a regular pentagon, and therefore the polygonal vent 26 is also a regular pentagon.

In addition to being joined to each other along their lateral edges 74, the roof panels are joined to the top 28 of the base 22 using the same apparatus used to join the lateral edges of the wall panels 32. Once all the edges are joined, there remain gaps near the corners of adjacent panels, so there is still a need to join the panels at their corners to provide a fully enclosed environment inside the greenhouse and to enhance the structural strength of the greenhouse. Since both the roof panels 38 and 40 and the wall panels 32 and 34 have rounded corners, joining the corners requires various special fixtures whose construction depends on the angle of the corner and how many corners are to be joined. At the bottom of the base, there are only two panels to be joined, so this is done using a fixture 44 (see FIG. 7A). At the top 28 of the base where the roof 24 is connected, there are four corners to be joined, and a fixture 46 (see FIG. 8A) is used. At the vertices of the polygonal hole 42, where the top edges of the roof panels come together, fixtures 210 and 230 (see FIGS. 11A and 11B) are used to join those corners and support the polygonal vent. Other fixtures 48 and 190 are used to join the corners of the door 36 to the panels which it abuts. All these fixtures for joining corners are further discussed below.

Figure 2A:
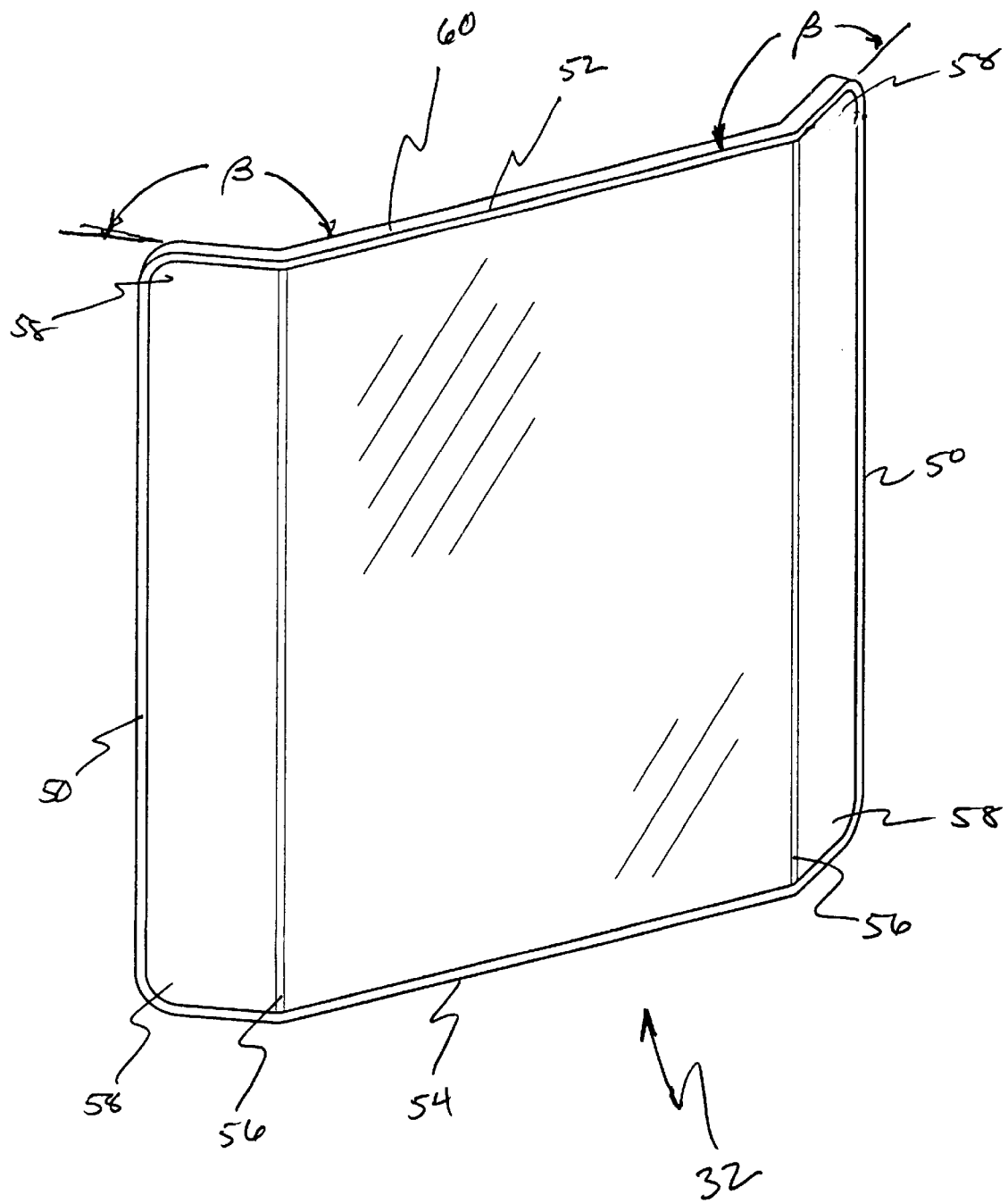
FIG. 2A is a drawing of the panels used to build the base of the embodiment shown in FIG. 1.
Figure 2B:
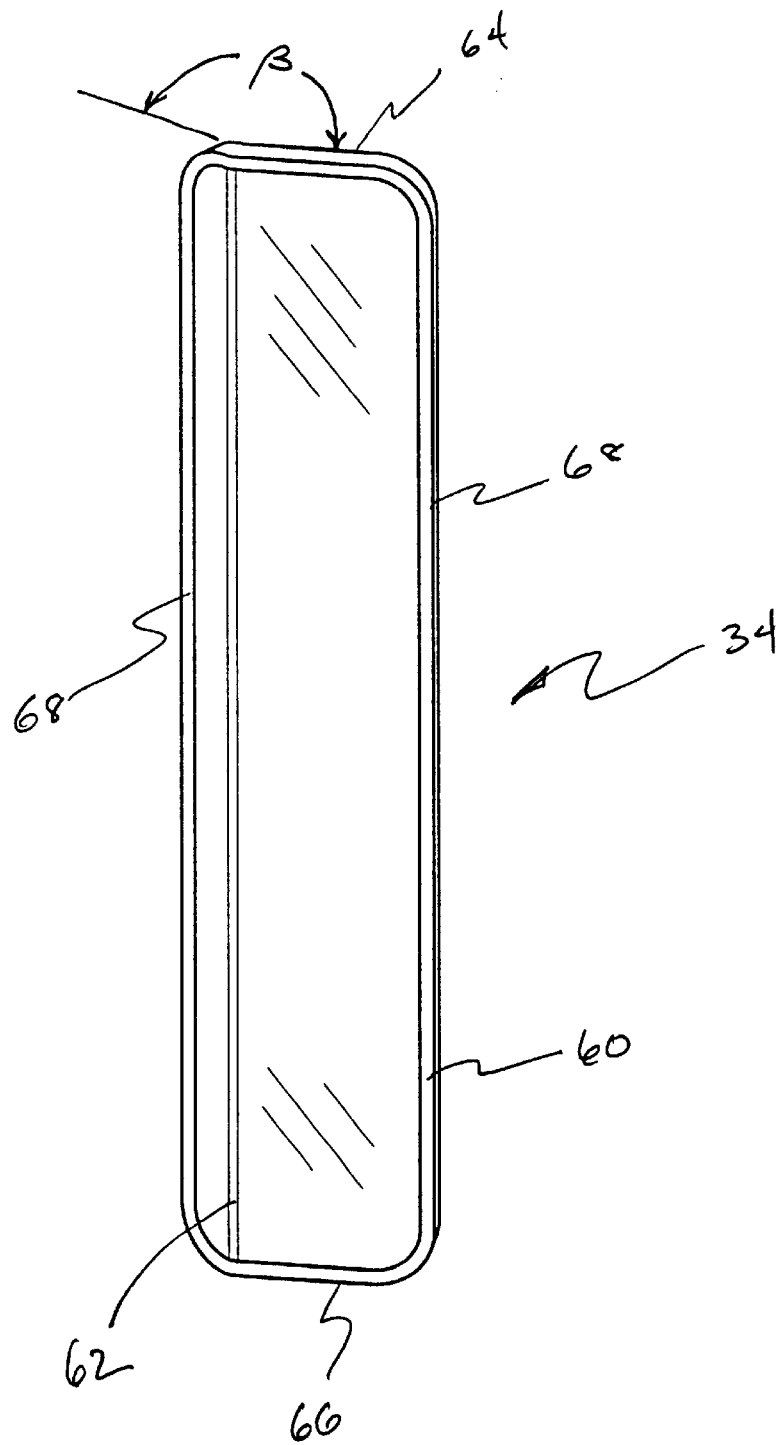
FIG. 2B is a drawing of a door wall panel used next to the door of the inventive greenhouse.
Figure 2C:
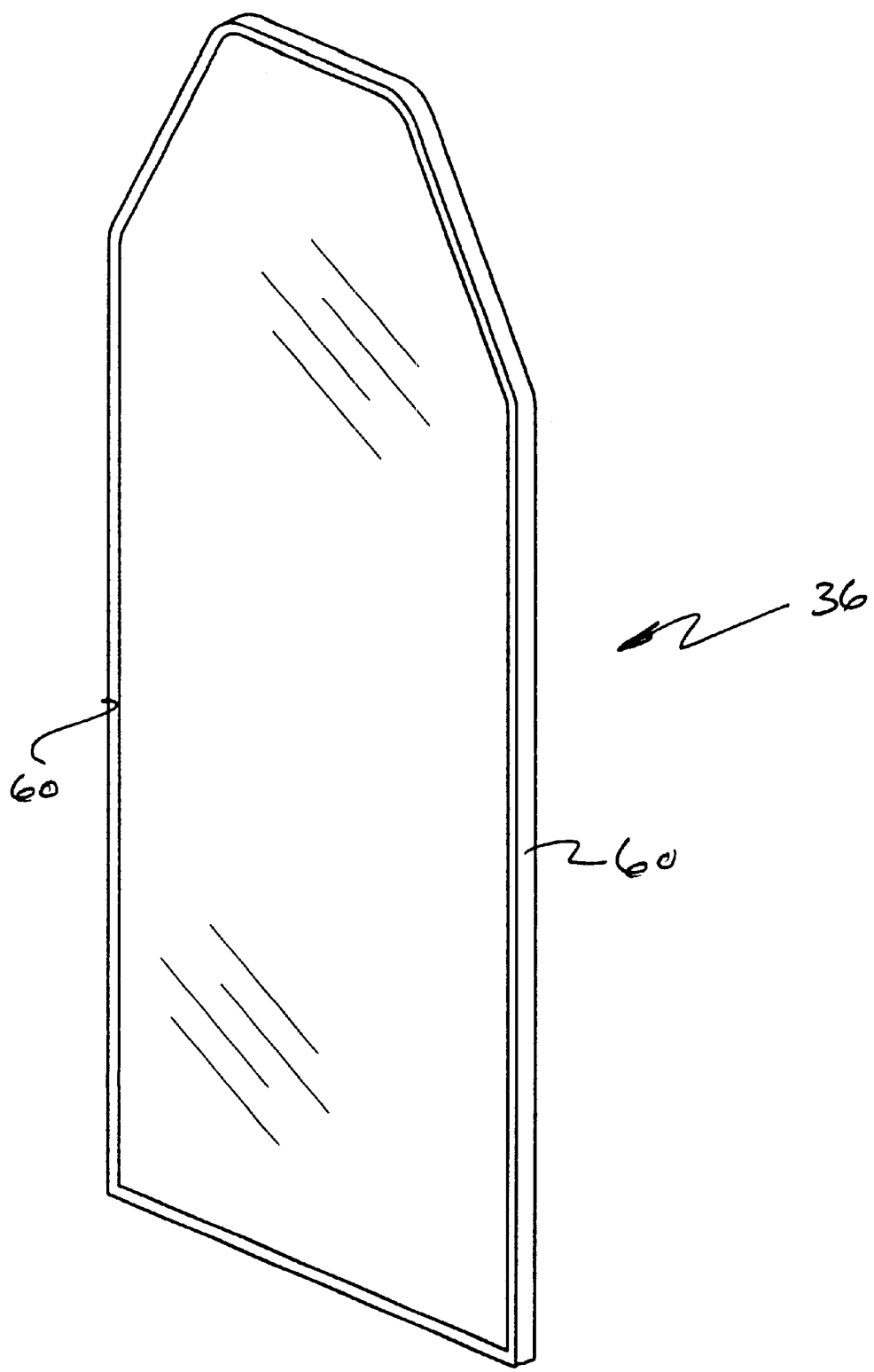
FIG. 2C is a drawing of a door.

FIGS. 2A, 2B and 2C, illustrate the construction of the wall panels 32, door wall panels 34 and the door 36 that make up the base 22. FIG. 2A illustrates a wall panel 32. Each wall panel has lateral edges 50, a top edge 52, a bottom edge 54 and bends 56 therein. The number of bends 56 in the wall panel and the bend angle β both depend on the number of sides in the polygonal shape of the base 22 and the number of wall panels 32 used. For the preferred ten-sided base with four wall panels 32, there are two bends 56 and β is 144 degrees. Each wall panel 32 and door wall panel 34 has rounded corners 58, preferably with about a 3 inch radius of curvature.

An F-extrusion 60 (discussed below in connection with FIG. 6) wraps around the entire perimeter of each wall panel 32. The F-extrusion, so called because it is shaped like the letter "F," is extruded from polyvinyl chloride (PVC), helps to stiffen each panel, and provides a means by which each panel is joined along its edges and corners to adjacent wall panels and to the roof. The F-extrusions are preferably bonded to the perimeter of the wall panels using a methylacrylate adhesive which fuses the F extrusion 60 and the wall panel 32 together, although any suitable sealant or adhesive or combinations thereof could be used. As further explained below, the panels are joined by abutting the lateral edges of adjacent panels, whether they be wall panels 32, door wall panels 34, or a door 36, and clamping the F-extrusions together.

FIG. 2B illustrates a door wall panel 34. There are two of these for each door in the greenhouse—one on either side of the door—and they are necessary for the base 22 to be able to accommodate the door 36. The door wall panel 34 shown in the figure is a right panel; a left panel is simply a mirror image of the right panel. Whether a left or right panel, the door wall panel is very similar to the wall panel. It has the same height as a wall panel 32, but a lesser width. The door wall panel has lateral edges 68, a top edge 64, a bottom edge 66 and one bend 62 therein with a bend angle β of about 144 degrees, instead of two such bends as in the wall panel 32. The door wall panels are made of the same polycarbonate material as the wall panels 32, are formed in the same way, and also have an F-extrusion 60 attached around their entire perimeter for additional strength and joining to other panels.

FIG. 2C illustrates the construction of the door 36. The door is a flat sheet of polycarbonate material cut to the proper shape—in this case, a rectangle with a tapered top. As with the other panels that make up the base, the door 36 has an F-extrusion 60 attached around its entire perimeter to strengthen it and so that it can be attached to adjacent door wall panels.

The wall panels 32, door wall panels 34, and door 36 are all built using any transparent, partially transparent, or translucent material that allows for spectral transmission of light needed for plant growth. Preferably, they are built using a rigid polymer material having two parallel layers supported by a plurality of ribs positioned between the layers. The ribs may be the same or a different material as the parallel layers. Most preferably, the material used is a double—walled horticultural grade polycarbonate material. Polycarbonate is ideal for this application because of its high strength, low weight, and favorable optical and heat transfer characteristics. The polycarbonate material is transparent and has two thin walls separated and supported by a plurality of ribs. To promote drainage and maximize panel strength, the ribs are oriented so that they will run vertically when the wall panels are installed. The polycarbonate panels are formed using a heat-forming process.

FIGS. 3A and 3B illustrate the construction of the panels that comprise the hemispherical roof 24; as explained above, the roof comprises a plurality of roof panels 38 and one or more roof door panels 40 joined together along their lateral edges. FIG. 3A illustrates the construction of a roof panel 38; all the roof panels 38 are identical. Each roof panel 38 is substantially wedge-shaped and has a top edge 70, a bottom edge 72, and a pair of lateral edges 74. Since the roof 24 is preferably geodesic, each roof panel has geodesic features, including a plurality of polygonal facets. The polygonal facets include several triangles 76 and a trapezoid 78. Between the facets there are elongated strips 80 that can be used to position and attach solar cells to the roof. As with the wall panels, an F-extrusion 60 is attached to the edges of the roof panel around the entire perimeter. The F extrusion stiffens the roof panel and provides a means for joining to other panels. FIG. 3B illustrates the construction of a roof door panel 40. The roof door panel, so called because it is the roof panel whose position in the roof coincides with the position of the door 36, is identical to the roof panels 38 in every respect, except that the door roof panel has a cutout 82 in the trapezoid 78 to accommodate the door 36.

When the roof 24 is assembled, the roof panels 38 are joined to adjacent roof panels and the roof door panel 40 along their lateral edges. Once the roof is assembled, the lower edges 72 of the roof panels and the roof door panel are joined to the top 28 of the base. The roof 24 is aligned on the base 22 such that the lateral edges 72 of the roof panels 38 and roof door panels 40 align with the lateral edges 50 of the wall panels and the lateral edges 68 of the door wall panels. When all the roof panels are assembled, the top edges 70 of the roof panels form a polygonal hole 42 at the apex of the roof. In the preferred embodiment, the roof 24 comprises four roof panels 38 and one roof door panel 40 which, when joined together, form a pentagonal hole at the apex of the roof. A different number of panels, ranging between 2 and 20 panels, may be used for the roof. The number of panels will depend on the size of the greenhouse to be produced. Like the panels that make up the base, the roof panels 38 and roof door panels 40 are formed using a transparent, partially transparent or translucent material, and are preferably made using a double-walled polycarbonate material. The polycarbonate material is formed into the roof panels 38 and roof door panels 40 using a heat forming process.

Figure 4:
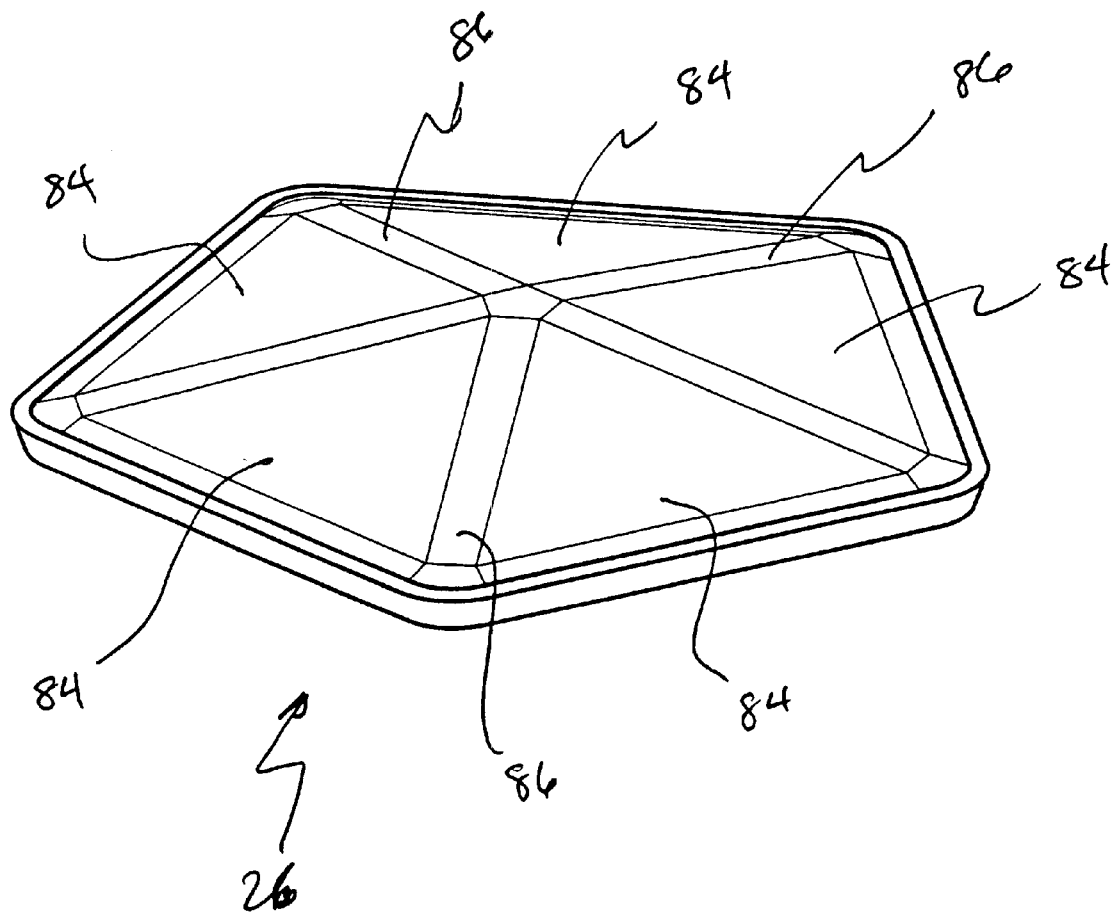
FIG. 4 is an isometric drawing of a polygonal panel which covers a polygonal hole remaining in the roof after the plurality of panels that make up the roof are assembled.

FIG. 4 illustrates the polygonal vent 26, which covers the polygonal hole 42 at the apex of the roof 24. The polygonal vent illustrated is a regular pentagon. Since the roof 24 is geodesic, the polygonal vent 26 is likewise part of a geodesic structure and includes facets 84, as well as elongated strips 86 between the facets which can be used to install solar cells. Since the hole 42 at the apex is pentagonal and the polygonal vent is meant to cover the hole, the polygonal vent is also pentagonal, although it shape will vary depending on the number of panels that make up the roof. The polygonal vent 26 is slightly larger than the hole and, as further discussed below, can move between an open position and a closed position. The polygonal vent 26 also has a gasket or other seal around its perimeter, so that is seals the polygonal hole 42 when it is in the closed position. Like the panels that make up the base and the roof, the polygonal vent 26 is made of formed polycarbonate and has F extrusions attached to the straight portions of its perimeter. Each vertex of the polygonal vent 26 has attached thereto the fixture 210 shown in FIG. 11A, which connects the ends of the F extrusions 60 attached along the straight edges of the vent 26. The F extrusions 60 attached to the vent 26 create a sealing surface, while the F extrusions and the fixtures 210 together enhance the stiffness of the vent 26.

Figure 5:
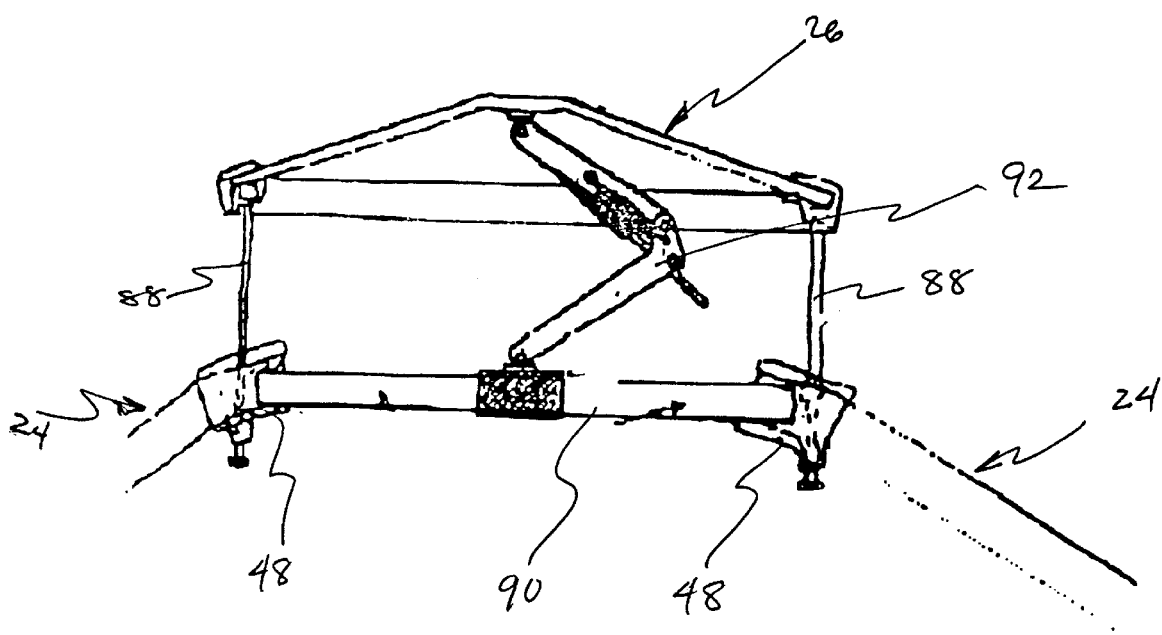
FIG. 5 is a cross-section of the upper part of the roof illustrating the automatic opening and closing of the polygonal roof vent.

FIG. 5 illustrates how the polygonal vent 26 is attached to the apex of the roof 24, and the means by which the vent opens and closes automatically in response to the air temperature at the apex of the roof. At each of its vertices, the polygonal vent 26 has attached a rod 88. Similarly, at each vertex of the polygonal hole 42 there is attached a fixture 48 which receives the rod 88 and allows the rod a limited range of vertical movement whilst preventing horizontal movement. The fixtures 48 at each vertex also support a platform 90 on which rests a temperature-sensitive actuator 92 of a type well known in the art. In response to the temperature of the air at the apex of the roof, the actuator 92 lifts and lowers the polygonal vent 26; when the temperature inside is hot, the vent opens, and when the temperature inside is cold, the vent closes. When the vent 26 is open, warm air convects out, drawing cooler outside air into the interior of the greenhouse through vents (not shown) at the bottom of the base. Thus, the vent 26 regulates the air temperature in the interior of the greenhouse 20.

Figure 6:
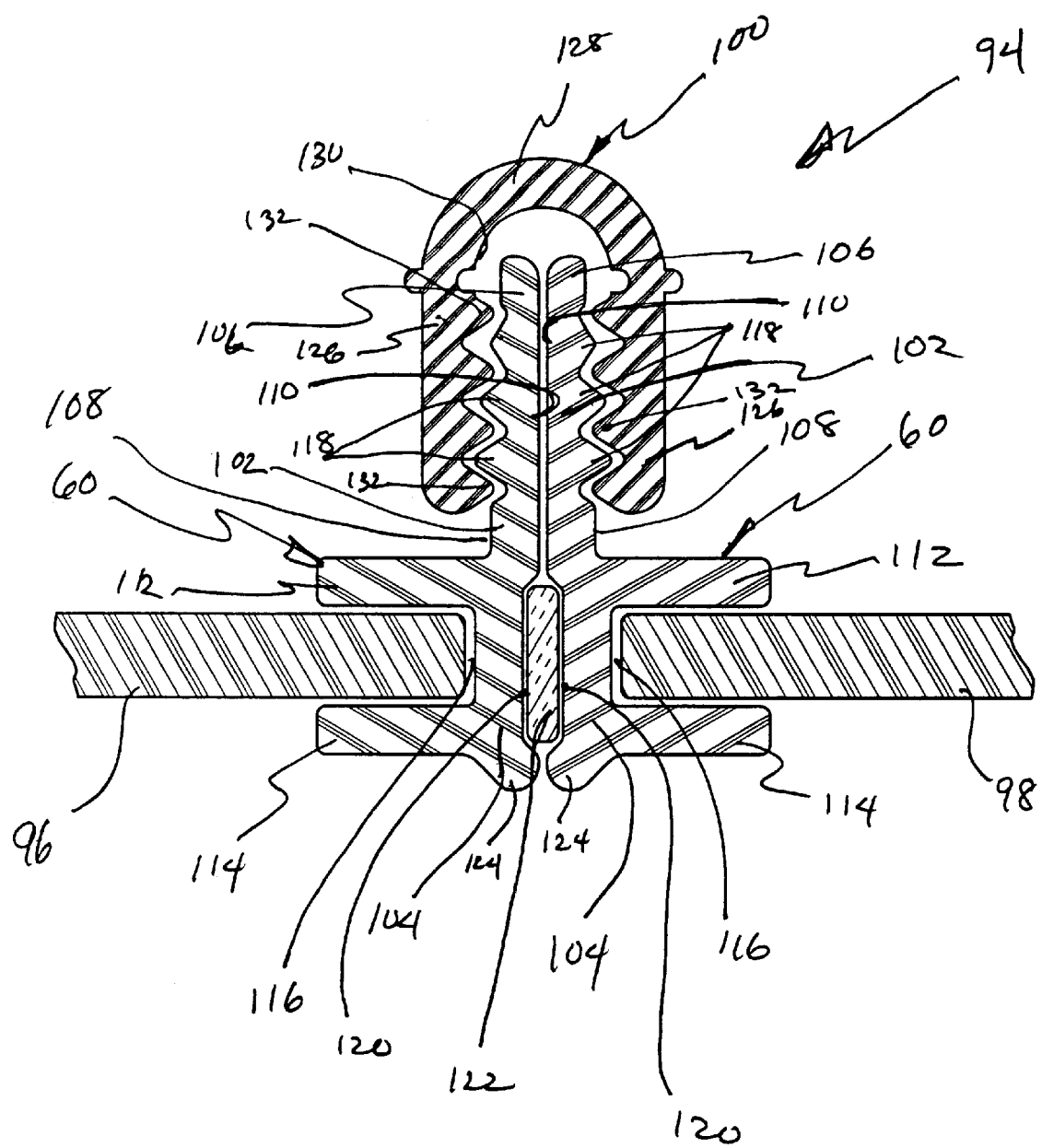
FIG. 6 is a cross-sectional drawing of an embodiment of a fixture used to join a pair of panels along their abutting edges.

FIG. 6 illustrates an embodiment of the apparatus 94 used to join a first panel 96 and a second panel 98 together along their abutting edges. In the greenhouse 20, the apparatus 94 is used to join the wall panels 32 and the roof panels 38 to each other along their lateral edges, and used to join the lower edges 72 of the roof panels 38 and the roof door panel 40 to the top 28 of the base 22. The apparatus 94 comprises a pair of F-extrusions 60 and a C-extrusion 100; both the F extrusions and C extrusion can be made using any material, but are preferably made using a moldable plastic, and most preferably are made using poly vinyl chloride (PVC) material.

Each F-extrusion 60 comprises a stem 102 having an outer end 104, an inner end 106, a panel side 108 and a mating side 110. A pair of flanges 112 and 114 are positioned toward the outer end of the stem 102 and project from the panel side 108 of the F-extrusion to form a channel 116 therebetween. The channel 116 receives the edges of panels 96 and 98, which are bonded to the F-extrusion. In the preferred embodiment, the F extrusions are bonded to the panels using a methylacrylate adhesive that fuses the PVC material of the extrusion to the polycarbonate material of the panels. The F extrusions 60 may, however, be attached to the panels 96 and 98 using any suitable adhesives, sealants, or combinations thereof. Closer to the inner end of the stem 102, and positioned along the panel side 108, are a plurality of teeth 118 projecting from the panel side 108. As further explained below, these teeth 118 are used to retain a C-extrusion placed on a pair of abutting F-extrusions. The mating side of each F-extrusion has a notch 120 therein designed to form a cavity when the mating sides 110 of two F-extrusions are placed together. The cavity is designed to receive some form of sealant 122 so that the joint will be impervious to the entrance of dirt, air, or water. The F extrusion also includes a sealing tab 124 projecting from the outer end 104 of the stem. The sealing tab 124 helps seal the joint to prevent the entry of moisture or other contaminants.

The C-extrusion, so called because it is shaped like the letter "C," comprises a pair of legs 126 and a connecting portion which connects both legs 126 at one end thereof. The inside surfaces 130 of the legs have thereon a plurality of teeth 132 which engage the plurality of teeth 118 on the stem of the F-extrusions 60. There are two sets of teeth; each set is designed to engage the teeth 118 on one of the F-extrusions.

In use, the F-extrusions are attached to the edges of adjoining panels 96 and 98, and are positioned in a mirror-image relation with a mating side 110 of one F-extrusion in contact with the mating side 110 of the other F-extrusion. The C-extrusion is placed over the stems 102 of both F extrusions and holds the two extrusions securely together with their mating sides abutting each other. In this way, any two panels in the greenhouse structure can be held together securely along their edges.

Figure 7A:
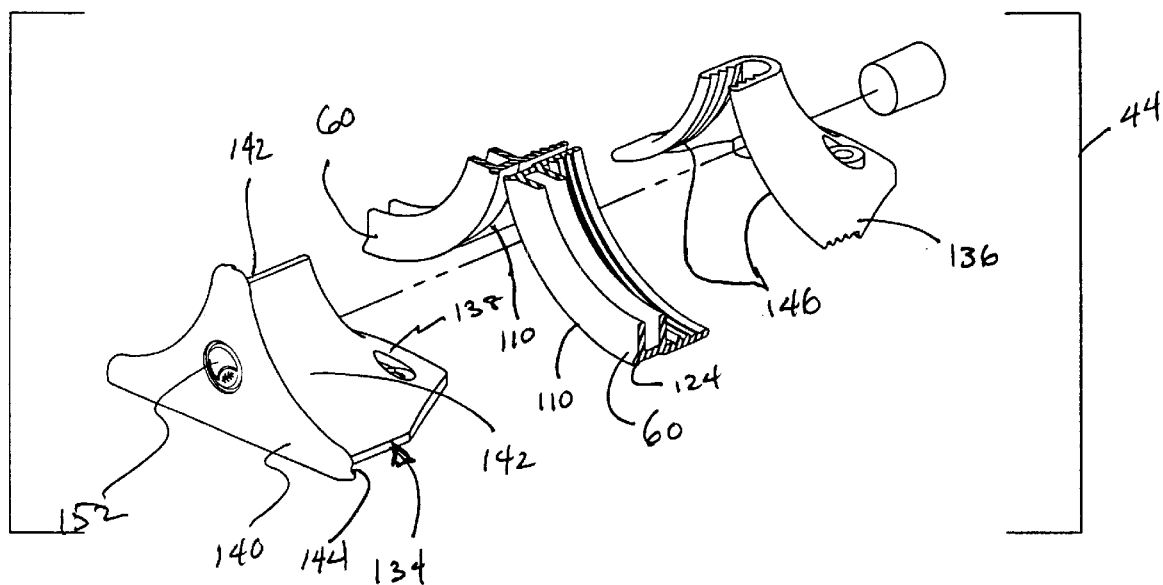
FIG. 7A is an isometric view of an embodiment of a fixture used to join the corners of two adjoining panels in the base to a foundation.
Figure 7B:
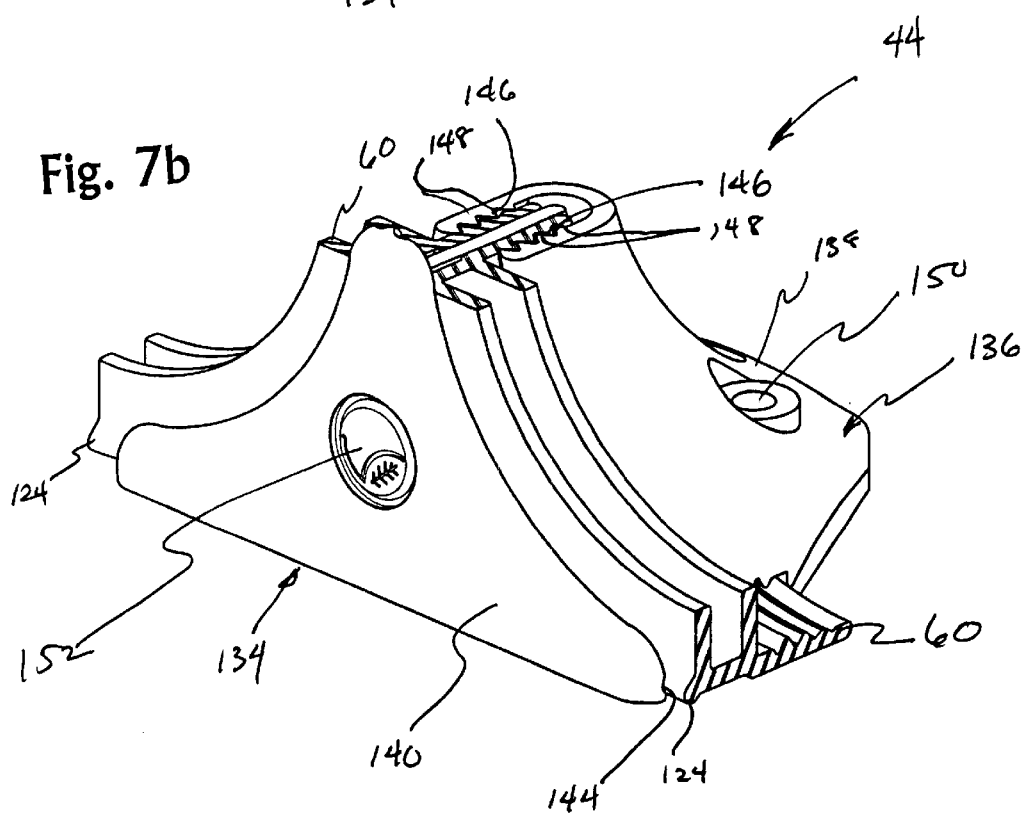
FIG. 7B is an isometric view of the fixture of FIG. 7A, shown in its assembled state.

FIGS. 7A and 7B illustrate a first embodiment of a fixture 44 used to join the radiused, 90-degree corners of two wall panels and, having joined the two panels, optionally attaching the wall panels to a foundation. In the greenhouse 20, this fixture 44 is used to join the wall panels 32 and 34 to a foundation to which the greenhouse is attached. FIG. 7A illustrates the different parts of the fixture 44 and how they fit together. The fixture 44 comprises a base 134 and a clip 136. The clip 136 generally has the same shape as the base and attaches to the base to secure the corners of the panels to the base. The base includes a front surface 138, a rear surface 140, and a pair of curved bearing surfaces 142 extending between the front surface 138 and rear surface 140. The bearing surfaces turn through the same angle as the panel corners (90 degrees in this case), are normal to the rear surface 140, and contact the mating sides 110 of F extrusions attached around the rounded corners of the panels to be joined. In the fixture 44, the bearing surfaces turn through 90 degrees, but the fixture 44 could be made to accommodate any two panels as long as their corner angles sum to 180 degrees. A groove 144 at the intersection of the curved bearing surfaces 142 and the rear surface 140 is designed to receive the sealing tab 124 which projects from the F-extrusion (see FIG. 6), thus sealing the intersection of the panels with the fixture 44 and preventing the movement of moisture or contaminants through the joint.

The clip 136 has the same general shape as the base 134, and has a pair of gripping surfaces 146 having a plurality of teeth 148. The teeth 148 are designed to engage the teeth on the stems of the F-extrusions whose mating sides are positioned along the curved bearing surfaces 142, much the same way the teeth on the C extrusion 100 engage the teeth on the F extrusion 60. In operation, the panels are placed such that the F extrusions 60 attached thereto contact the bearing surfaces 142. The clip 136 is then secured to the base such that it engages the F extrusions, and is then attached to the base by a fastener inserted into the hole 150 in the front surface 138, thereby securing the corners of the panels to the fixture 44 and to each other. FIG. 7B illustrates the fixture in its assembled, operational state. Both the base 134 and the clip 136 have a hole 152 therein through which items such as hoses or electric cords can be fed.

Figure 8A:
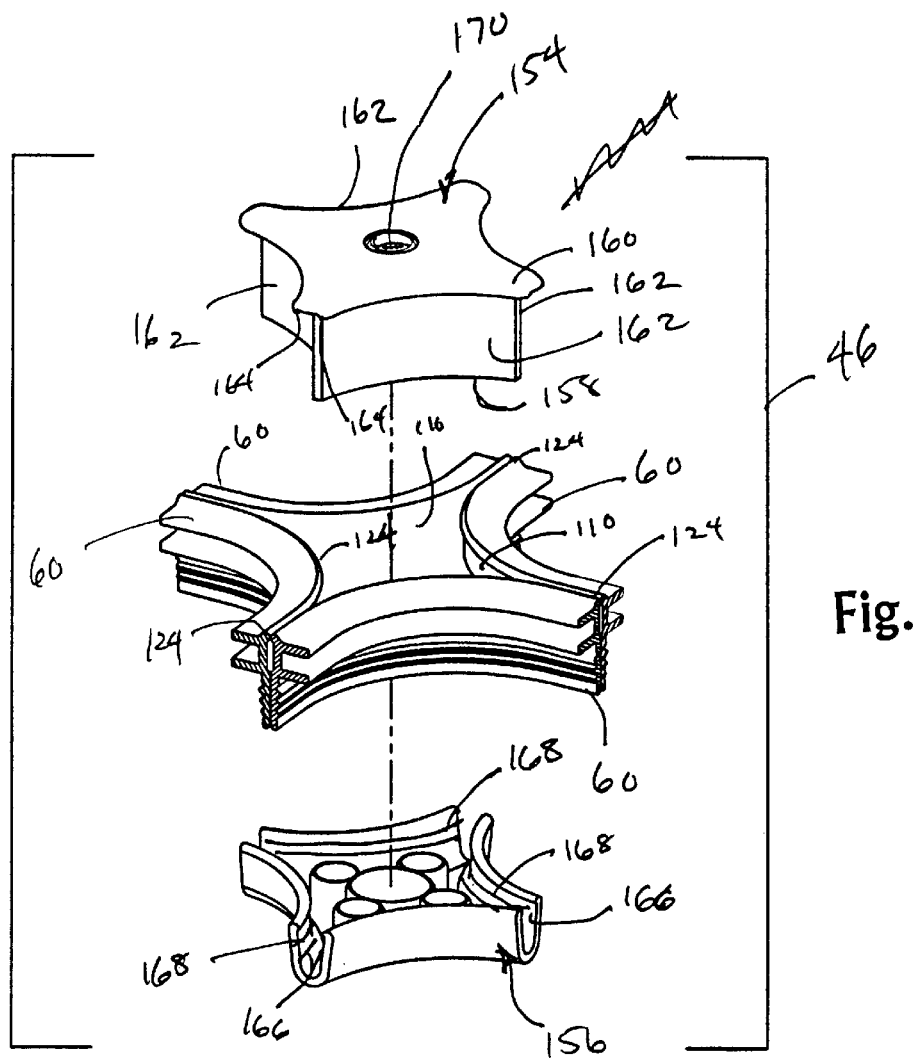
FIG. 8A is an exploded isometric view of an embodiment of a fixture used to join the corners of four adjoining panels.
Figure 8B:
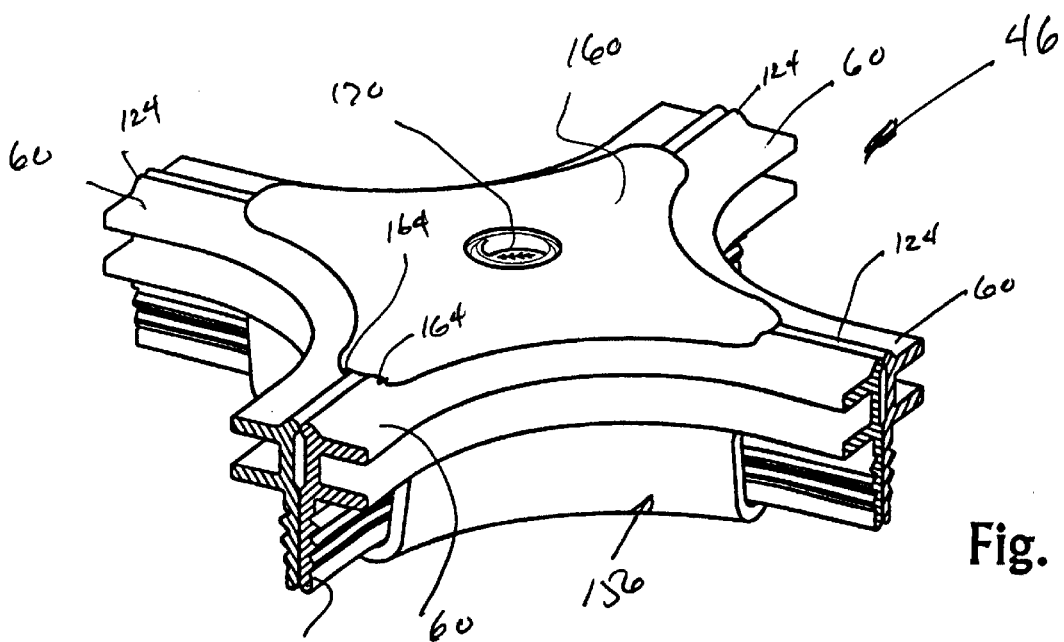
FIG. 8B is an isometric view of the fixture of FIG. 8A, shown in its assembled state.

FIGS. 8A and 8B illustrate a second embodiment of a fixture 46 used to join the corners of four panels. The fixture 46 is a four-panel variation of the two-panel fixture 44. In the greenhouse 20, the fixture 46 is used at the four-way intersections of panels in the base (the wall panels 32 and the door wall panels 34) and panels in the roof (roof panels 38 and the roof door panels 40). FIG. 8A illustrates the different parts of the fixture 46 and how they fit together. The fixture 46 comprises a base 154 and a clip 156. The clip has the same general shape as the base, and attaches to the base to secure F extrusions on the corners of the panels to the base. The base includes a front surface 158, a rear surface 160, and four curved bearing surfaces 162 extending between the front surface 158 and rear surface 160. The bearing surfaces turn through the same angle as the panel corners, are normal to the rear surface 160, and contact the mating sides of F extrusions attached around the rounded corners of four panels. In the fixture 46, the bearing surfaces turn through 90 degrees, but the fixture 46 could be made to accommodate any four panels as long as their corner angles sum to 360 degrees. A groove 164 at the intersection of the curved bearing surfaces 162 and the rear surface 160 is designed to receive the sealing tab 124 which projects from the F-extrusion (see FIG. 6), thus sealing the intersection of the panels with the fixture 46 and preventing the movement of moisture or contaminants through the joint.

The clip 156 has the same general shape as the base 154, and has four gripping surfaces 166 having a plurality of teeth 168. The teeth 168 are designed to engage the teeth on the stems of the F-extrusions whose mating sides are positioned along the curved bearing surfaces 162, much the same way the teeth on the C extrusion 100 engage the teeth on the F extrusion 60. In operation, the panels are placed such that the mating sides 110 of the F extrusions 60 attached thereto contact the bearing surfaces 162. The clip 156 is then secured to the base such that it engages the F extrusions, thereby securing the F extrusions and the corners of the panels to the fixture 46 and to each other. FIG. 8B illustrates the fixture in its assembled, operational state. Both the base 154 and the clip 156 have a hole therein through which items such as hoses or electric cords can be fed.

FIGS. 9A and 9B illustrate a third embodiment of a fixture 48 used to join the rounded corner of one panel to a rounded corner of another. In the greenhouse 20, this fixture 48 is used to attach an upper portion of the door 36 to a door wall panel 62. FIG. 9A illustrates the different parts of the fixture 48 and how they fit together. The fixture 48 comprises a base 172 and a clip 174 which generally has the same shape as the base and attaches to the base to secure the corners of the panels to the base. The base includes a front surface 176, a rear surface 178, and a pair of curved bearing surfaces 180 extending between the front surface 176 and rear surface 178. The bearing surfaces 180 turn through the same angle as the panel corners, are normal to the rear surface 178, and contact the mating sides 110 of F extrusions attached around the rounded corner of the door panel 36. In the fixture 48, the bearing surfaces turn through 126 degrees, but the fixture 48 could be made to accommodate any two corners. A groove 182 at the intersection of the curved bearing surfaces 180 and the rear surface 178 is designed to receive the sealing tab 124 which projects from the F-extrusion 60 (see FIG. 6), thus sealing the intersection of the panels with the fixture 48 and preventing penetration of moisture or contaminants through the joint.

The clip 174 has the same general shape as the base 172, and has a pair of gripping surfaces 184 having a plurality of teeth 186. The teeth 186 are designed to engage the teeth on the stems of the F-extrusions 60 whose mating sides 110 are positioned along the curved bearing surfaces 180, much the same way as the teeth on the C extrusion 100 engage the teeth on the F extrusion 60. In operation, the door panel 36 is placed such that the mating sides 110 of the F extrusions 60 attached thereto contact the bearing surfaces 180. The clip 174 is then secured to the base such that it engages the F extrusions, thereby securing the corners of the door to the fixture 48 and to door wall panel. FIG. 9B illustrates the fixture in its assembled, operational state.

Figure 10A:
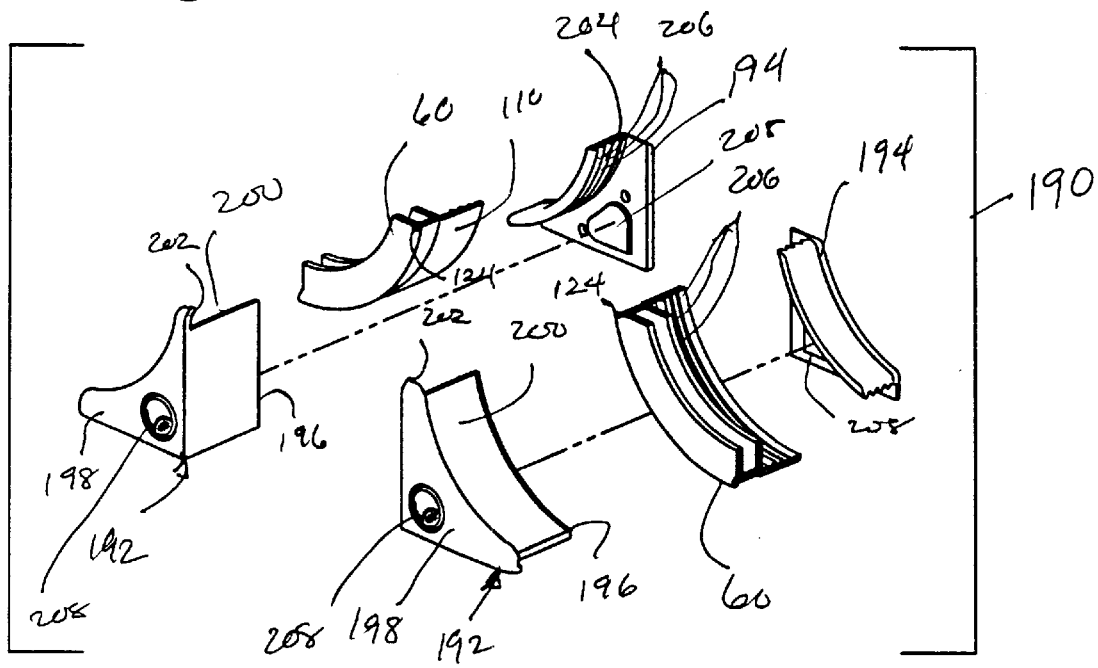
FIG. 10A is an exploded isometric view of an embodiment of a fixture used to install a door in a wall panel.
Figure 10B:
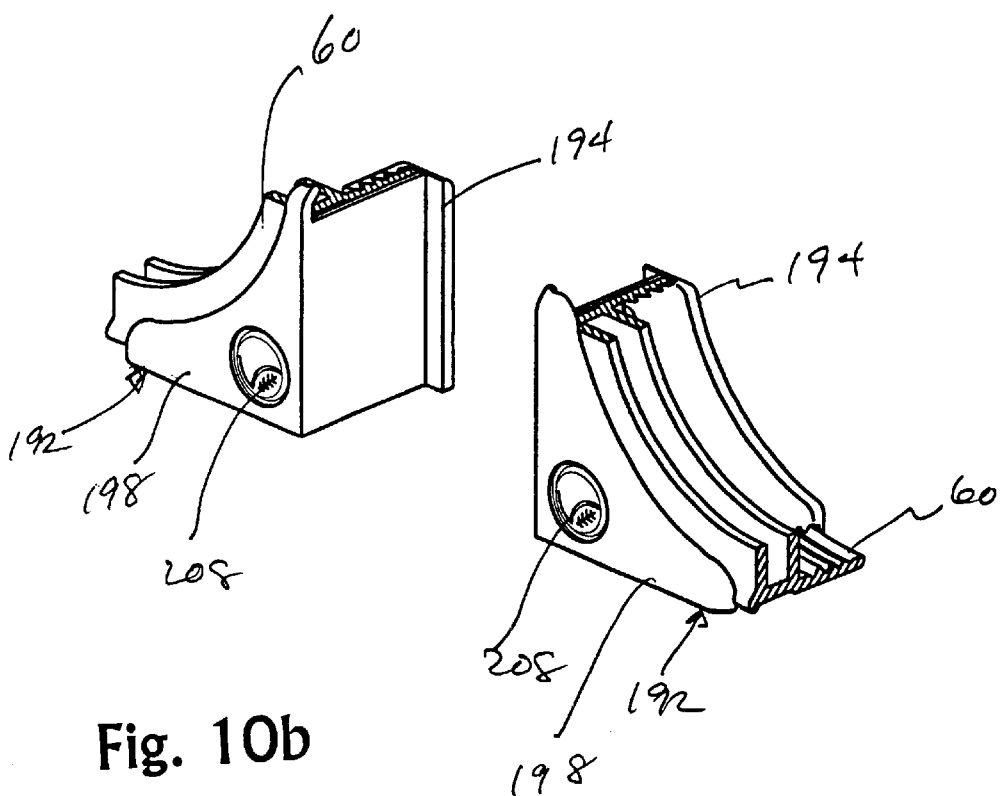
FIG. 10B is an isometric view of the fixture of FIG. 10A, shown in its assembled state.

FIGS. 10A and 10B illustrate a fourth embodiment of a fixture 190 used to square off the rounded corner of a panel. In the greenhouse 20, the fixture 190 is used at the bottom of the door wall panels 62 to stabilize, anchor and make rigid the door frame. FIG. 10A illustrates the different parts of the fixture 190 and how they fit together. The fixture 190 comprises a base 192 and a clip 194 which generally has the same shape as the base and attaches to the base to secure the corner of the panel to the base. The base includes a front surface 196, a rear surface 198, and a curved bearing surface 200 extending between the front surface 196 and rear surface 198. The bearing surface 200 turns through the same angle as the panel corner, is normal to the rear surface 198, and contacts the mating side 110 of the F extrusions attached around the rounded corner of the panel. In the fixture 190, the bearing surface turns through 90 degrees, but the fixture 190 could be made to accommodate any corner angle. A groove 202 at the intersection of the curved bearing surface 200 and the rear surface 198 is designed to receive the sealing tab 124 which projects from the F-extrusion (see FIG. 6), thus sealing the intersection of the panel with the fixture 190 and preventing penetration of moisture or contaminants through the joint. The base 192 additionally has a slot therein into which a bolt or other fastener can be inserted to attach the base 192 to a foundation.

The clip 194 has the same general shape as the base 192, and has an gripping surface 204 having a plurality of teeth 206. The teeth 206 are designed to engage the teeth on the stem of the F-extrusion whose mating side is positioned along the curved bearing surface 200, much the same way the teeth on the C extrusion 100 engage the teeth on the F extrusion 60. In operation, the panels are placed such that the mating sides 110 of the F extrusions 60 attached thereto contact the bearing surfaces 200. The clip 194 is then secured to the base such that it engages the F extrusion, thereby securing the corner of the panel to the fixture 190. FIG. 10B illustrates the fixture in its assembled, operational state.

Figure 11A:
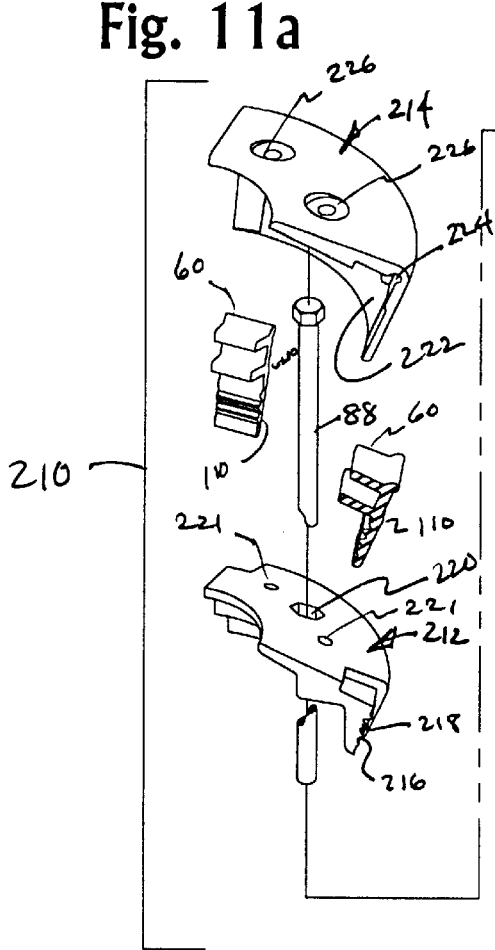
FIG. 11A is an exploded isometric view of a fixture used at vertices of the polygonal vent to attach the polygonal vent to the roof.
Figure 11B:
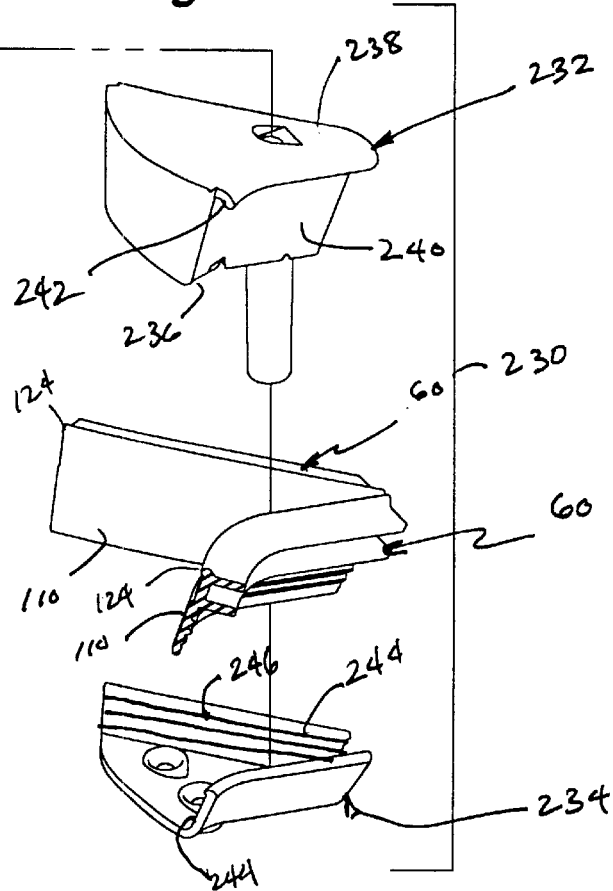
FIG. 11B is an exploded isometric view of a fixture used at the vertices of a polygonal hole to allow a polygonal vent to be attached thereto.
Figure 11C:
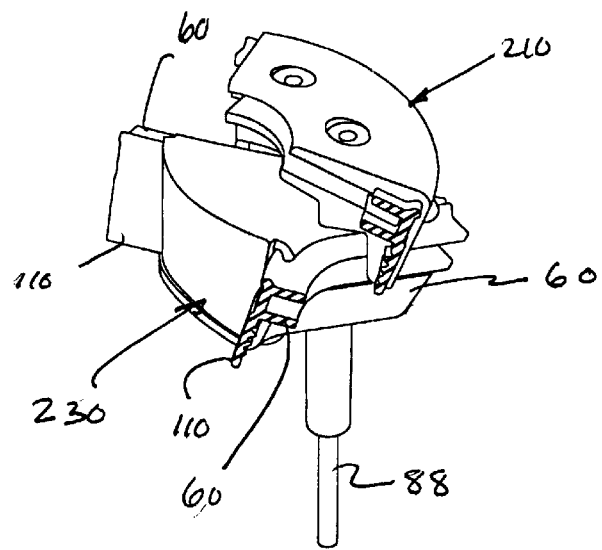
FIG. 11C is an exploded isometric view of the fixtures of FIGS. 11A and 11B, shown in their assembled state.

FIGS. 11A, 11B and 11C illustrate two fixtures 210 and 230 used to connect a moving panel to the rounded corners of two panels while providing support to the moving panel. The fixture 230 functions similarly to the fixtures 44 and 46, but provides some additional utility in supporting a moveable panel. In the greenhouse 20, these fixtures 210 and 230 are used at the vertices of the polygonal hole 42 to support the polygonal vent 26.

FIG. 11A illustrates the different parts of the fixture 210 and how they fit together. This fixture 210 differs from the others in that it holds only the ends of the F extrusions, instead of a middle portion of the extrusion. The fixture 210 comprises a base 212 and a clip 214 that has generally the same shape as the base and attaches thereto. The base 212 includes a pair of gripping surfaces 216 on its ends which hold the end of the F extrusions 60 attached to the straight portions of the polygonal vent 26. The gripping surfaces 216 include a plurality of teeth 218 that engage the teeth on the panel side of the F extrusion 60, much the same way the teeth on the C extrusion 100 engage the teeth on the F extrusion 60. The base 212 also has therein a hole 220 to receive the rod 88, which then allows the polygonal vent 26 to move vertically but not horizontally and a pair of holes 221 for receiving fasteners to attach the clip to the base 212. The clip 214 includes a bearing surface 222 designed to engage the mating sides 110 of the F extrusions whose ends are positioned in the base, a groove 224 therein to receive the sealing tab 124 of the F extrusion, and a pair of holes 226 to allow the clip 214 to be attached to the base 212 with fasteners. In operation, a base 212 is positioned at each vertex of the polygonal panel 26 with the ends of the F extrusions 60 positioned in the sides of the base such that the teeth on the extrusion engage the teeth 218 on the gripping surfaces 216 of the base. The rod 88 is inserted in the hole 220, and the clip 214 is then attached to the base 212 such that the bearing surface 222 contacts the mating sides 110 of the F extrusions 60. Fasteners are inserted into the holes 221 and 226 and tightened so that the clip 212 is secured to the base and engages the ends of the F extrusions, thereby securing the fixture 210 and the rod 88 to the vertices of the polygonal panel 26 to which the F extrusions are attached.

FIG. 11B illustrates the different parts of the fixture 230 and how they fit together. The fixture comprises a base 232 and a clip 234 which generally has the same shape as the base and attaches to the base to secure the corners of the panels to the base. The base includes a front surface 236, a rear surface 238, and a pair of curved bearing surfaces 240 extending between the front surface 236 and rear surface 238. The bearing surfaces 240 turn through the same angle as the panel corners, are normal to the rear surface 238, and contact the mating sides 110 of F extrusions attached around the rounded corners of the panels. In the fixture 230, the bearing surfaces turn through 126 degrees, but the fixture 230 could be made to accommodate any two corners. A groove 242 at the intersection of the curved bearing surfaces 240 and the rear surface 238 is designed to receive the sealing tab 124 which projects from the F-extrusion 60 (see FIG. 6), thus sealing the intersection of the panels with the fixture 230 and preventing penetration of moisture or contaminants through the joint.

The clip 234 has the same general shape as the base 232, and has a pair of gripping surfaces 244 having a plurality of teeth 246. The teeth 246 are designed to engage the teeth on the stems of the F-extrusions 60 whose mating sides 110 are positioned along the curved bearing surfaces 240, much the same way as the teeth on the C extrusion 100 engage the teeth on the F extrusion 60. In operation, the panels are placed such that the mating sides 110 of the F extrusions 60 attached thereto contact the bearing surfaces 240. The clip 234 is then secured to the base such that it engages the F extrusions, thereby securing the corners of the panels to the fixture 48 and to each other. FIG. 11C illustrates the fixtures 210 and 230 in their assembled, operational state.

The fixtures 44, 46, 48, 190, 210 and 230 can be made using any material, but are preferably made using a moldable plastic, and most preferably are made using poly vinyl chloride (PVC) material. Where the fixtures are made using a moldable plastic, molds are made of both the base and the clip of each fixture, and the pieces are then formed by injection molding the moldable plastic material.

Several embodiments of the present invention have been described. A person skilled in the art, however, will recognize that many other embodiments are possible within the scope of the claimed invention. For this reason, the scope of the invention is not to be determined from the description of the embodiments, but must instead be determined solely from the claims that follow.

What is claimed is:

1. A portable greenhouse structure comprising:
   a base in the shape of a right-polygonal cylinder having a top and a bottom, wherein the base comprises a plurality of wall panels connected along abutting edges;
   a hemispherical roof attached to the top of the base, wherein the hemispherical roof has a polygonal hole in an apex thereof, wherein the hemispherical roof is geodesic and includes a plurality of polygonal facets therein, and wherein the hemispherical roof further comprises a plurality of elongated flat areas formed therein between the polygonal facets;
   a polygonal panel having the same shape as the polygonal hole, wherein the polygonal panel is moveable between an open position and a closed position, wherein the polygonal panel sealably covers the polygonal hole when in the closed position; and
   one or a plurality of solar cells position on and attached to the elongated flat areas.

2. A portable greenhouse structure comprising:
   a base in the shape of a right-polygonal cylinder having a top and a bottom, wherein the base comprises a plurality of wall panels connected along abutting edges;
   a hemispherical roof attached to the top of the base, wherein the hemispherical roof has a polygonal hole in an apex thereof; and
   a polygonal panel having the same shape as the polygonal hole, wherein the polygonal panel is moveable between an open position and a closed position, wherein the polygonal panel sealably covers the polygonal hole when in the closed position, and wherein the polygonal panel automatically opens and closes according to the temperature inside the greenhouse.

3. A portable greenhouse structure comprising:
   a base in the shape of a right-polygonal cylinder having a top and a bottom, wherein the base comprises a plurality of wall panels connected along abutting edges;
   a hemispherical roof attached to the top of the base, wherein the hemispherical roof has a polygonal hole in an apex thereof; and
   a polygonal panel having the same shape as the polygonal hole, wherein the polygonal panel is moveable between an open position and a closed position, wherein the polygonal panel sealably covers the polygonal hole when in the closed position, wherein the base, the hemispherical roof and the polygonal panel are made with a transparent, semi-transparent, or translucent material, and wherein the base, the hemispherical roof and the polygonal panel are made with a laminated polycarbonate comprising a first sheet spaced apart from a second sheet by a plurality of ribs.

4. An apparatus for joining a plurality of rounded corners of a plurality of panels, the apparatus comprising:
   an extrusion attached to the rounded corner of each panel, wherein the extrusion comprises a mating side and a stem which projects away from the plane of the panel;
   a base having a front surface, a planar rear surface, and a plurality of curved bearing surfaces extending between the front surface and the rear surface, wherein the bearing surfaces on the base are sized and shaped to mate with the mating sides of the extrusions, and wherein the number of bearing surfaces on the base corresponds to the number of panels to be joined; and
   a clip having a plurality of gripping surfaces substantially conforming to the shape of the bearing surfaces on the base, wherein the clip is attachable to the base such that the extrusion stem is sandwiched between the gripping surfaces of the clip and the bearing surfaces of the base.

5. The apparatus of claim 4 wherein the F-extrusions comprise:
   a stem having an inner end, an outer end, a panel side and a mating side;
   a pair of spaced-apart flanges projecting from the panel side near the first end and adapted to receive the abutting edge of a panel therebetween; and
   a plurality of teeth project from the panel side between a middle and the inner end.

6. The apparatus of claim 5 wherein the clamp comprises a C-extrusion which is generally C-shaped and has an inner side and an outer side, the inner side having thereon a plurality of teeth that engage the plurality of teeth on the panel sides of the stems of the F-extrusions, wherein the inner side is adapted to receive and hold together the inner ends of the stems of a pair of F-extrusions positioned such that their mating sides abut each other.

7. The apparatus of claim 5 wherein the mating side of each F-extrusions has a notch therein positioned such that it will align with the notch on another F-extrusion when the mating sides abut, creating a cavity into which sealant can be injected.

8. The apparatus of claim 5 wherein the F-extrusion further comprises a sealing tab projecting from the mating side at the outer end of the stem.

9. The apparatus of claim 5 wherein the gripping surfaces on the clip have thereon a plurality of teeth designed to engage the plurality of teeth on the stem of the F-extrusion.

10. The apparatus of claim 5 wherein the base further comprises a plurality of grooves along the intersection of the rear wall and the curved bearing surfaces designed to accept the sealing tab of the F-extrusion.

11. The apparatus of claim 4 wherein the plurality of bearing surfaces on the base comprises 2, 3 or 4 bearing surfaces.

12. The apparatus of claim 4 wherein the plurality of bearing surfaces on the base comprises a number equal to the number of panels whose corners are to be joined.

13. A process for joining a plurality of rounded corners of a plurality of panels, the process comprising:
   attaching an extrusion attached to the rounded corner of each panel, wherein the extrusion comprises a mating side and a stem which projects away from the plane of the panel;
   abutting the mating side of each extrusion to a base having a front surface, a planar rear surface, and a plurality of curved bearing surfaces extending between the front surface and the rear surface, wherein the bearing surfaces on the base are sized and shaped to mate with the mating sides of the extrusions, and wherein the number of bearing surfaces on the base corresponds to the number of panels to be joined; and
   attaching the extrusions to the base using a clip having a plurality of gripping surfaces substantially conforming to the shape of the bearing surfaces on the base, wherein the clip is attachable to the base such that the extrusion stem is sandwiched between the bearing surfaces of the clip and the bearing surfaces of the base.

14. The method of claim 13 wherein the extrusion is an F-extrusion comprising:

a stem having an inner end, an outer end, a panel side and a mating side;

a pair of spaced-apart flanges projecting from the panel side near the first end and adapted to receive the abutting edge of a panel therebetween; and a plurality of teeth project from the panel side between a middle and the inner end.

15. The method of claim 14 wherein the F-extrusion further comprises a sealing tab projecting from the mating side at the outer end of the stem.

16. The method of claim 14 wherein the gripping surfaces on the clip have therein a plurality of teeth designed to engage the plurality of teeth on the stem of the F-extrusion.

17. The method of claim 15 wherein the base further comprises a plurality of grooves along the intersection of the rear wall and the curved bearing surfaces designed to accept the sealing tab of the F-extrusion.

18. The method of claim 13 wherein the plurality of bearing surfaces on the base comprises 2, 3 or 4 bearing surfaces.

19. The method of claim 13 wherein the plurality of bearing surfaces on the base comprises a number equal to the number of panels whose corners are to be joined.

* * * * *